Patented Oct. 11, 1938

2,132,454

UNITED STATES PATENT OFFICE 2,132,454

MANUFACTURE OF HYDROXY AMINO COMPOUNDS

Henry Hall Bassford, Jr., Naugatuck, Conn., assignor to United States Rubber Products, Inc., New York, N. Y., a corporation of Delaware No Drawing. Application July 6, 1935, Serial No. 30,167

7 Claims. (Cl. 260—130.5)

This invention relates to improvements in the manufacture of hydroxy amino compounds and more particularly of amino phenols.

An object of the invention is to provide an efficient and economical process of making amino hydroxy cyclic compounds directly from the nitro derivative of the parent cyclic compound. The cyclic compound may belong to either the carbocyclic or heterocyclic ring system. Another object is to provide an efficient process of making p-aminophenol from nitrobenzene without having to resort to costly equipment, or difficult and uneconomical chemical isolation operations. Other advantages will be apparent from the following description.

The process of the invention is applicable generally to the unsubstituted nitrobenzenes and its homologues and analogues, as well as to the substituted nitro compounds, for example, bromnitrobenzene, nitro-toluene, nitro-xylene, alphanitro-naphthalene, beta-nitro-naphthalene, etc., to yield the corresponding amino hydroxy derivatives, e. g., p-aminophenol from nitrobenzene, m-hydroxy-o-toluidine from o-nitrotoluene, etc. The nitro anthracenes and the nitro anthraquinones may also be used. Furthermore, the various heterocyclic nitro bodies, for example, nitro-pyridine, nitro-quinoline, nitrothiophene and others may be treated in like manner to yield the corresponding amino hydroxy derivatives.

The process of the present invention is broadly one of reacting the nitro compound in the presence of water with a suitable chemical reducing agent, preferably in a substantially neutral aqueous medium, to convert the nitro group into a hydroxylamine group and then rearranging the hydroxylamine compound in solution to the amino hydroxy compound, by addition to the solution of a non-oxidizing acid, preferably of a concentration sufficient to not excessively raise the water content, and heating the acidified solution at an elevated temperature to complete formation of the amino hydroxy compound and then precipitating the amino hydroxy compound by cooling and neutralizing the acidic solution. The hydroxy radical of the hydroxylamine group during the rearrangement, usually migrates to the position para to the amino group except where the para position is already occupied whereupon the hydroxy group takes the position ortho to the amino group.

The neutral reduction of the nitro-cyclic compound may be catalyzed by a water soluble salt of a non-oxidizing acid whose zinc salt is water soluble with ammonia, substituted ammonia, or any alkaline earth metal whose atomic weight is at least about 40; for example, ammonium chloride, ammonium sulphate, ammonium acetate, methyl ammonium chloride, calcium chloride.

The invention is herewith illustrated with a preferred embodiment of the invention, namely the production of para-aminophenol from nitrobenzene. In this process the nitrobenzene is added to a low percentage ammonium or alkaline earth salt solution, e. g. about 2–3% of the salt and the mix vigorously agitated while a reducing agent, for example zinc dust, is added over a short period of time, e. g. about a 10 minute period. In the succeeding five minutes or so of stirring of the mix the temperature rises to about 40° C. Zinc hydroxide formed by the reaction of zinc, nitrobenzene and water is removed by filtering or other suitable operation and the filtrate and washings are acidified with any non-oxidizing mineral acid. The acid solution is heated to about 80–100° C. for a short time and then cooled and neutralized, whereupon practically all of the p-aminophenol (approximately 86%) precipitates out of solution and may be recovered by filtration. Further evaporation of the remaining solution, cooling and neutralizing of the solution or acid, yields an additional amount of p-aminophenol crystals. p-Aminophenol is about 0.6% soluble at room temperature.

The reactions and fundamental steps may be represented as follows:

For the reducing step:

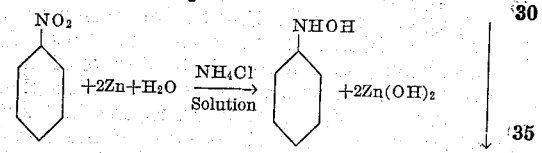

On addition of acid:

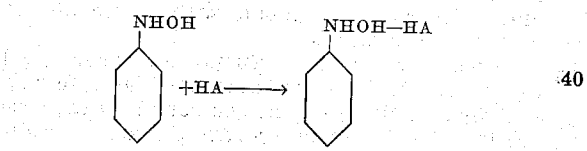

On heating up acid solution:

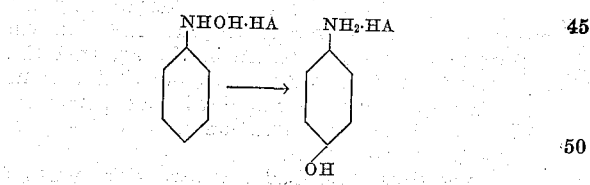

On neutralizing with MOH:

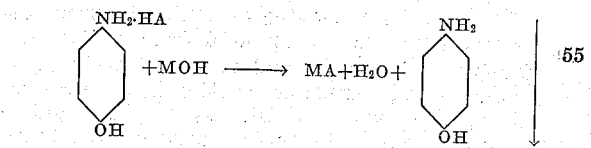

HA refers to the mineral acid; MOH refers to alkali; and MA refers to the alkali salt of the mineral acid HA.

The following example illustrates the invention more specifically:

*Example.*—13 pounds of zinc dust were added portionwise during a period of about 10 minutes with vigorous agitation to an emulsion of 10 pounds nitrobenzene with 240 pounds of a 2% aqueous solution of ammonium chloride. The temperature of the reaction mixture, after about 5 minutes additional stirring rose to approximately 46° C. (114° F.). The Zn(OH)$_2$ was removed by filtration and washed with about 70-100 pounds of water at about 45° C. The filtrate and combined washings were acidified with 14 pounds sulphuric acid (66° Bé.) and heated to about 80-100° C. for about 15 minutes, cooled and made slightly alkaline by adding concentrated aqueous ammonia. When the solution was cooled and neutralized most of the product precipitated because the volume of water was insufficient to dissolve more than a small portion of the p-aminophenol. This precipitate was filtered off and dried. The yield of the crude product (M. P. 176-184° C.) was about 4.9 pounds or 55.4% of theory based on the nitrobenzene used. On evaporation of the remaining solution about 0.8 pound more of the p-aminophenol was obtained, making a total combined yield of about 5.7 pounds (or 64.3% theory calculated on the nitrobenzene).

It has been observed that at temperatures below approximately 80° C. in the rearrangement step that only partial rearrangement of the phenyl hydroxylamine takes place so that it is expedient to use temperatures of at least 80° C.

Instead of using zinc dust as the reducing agent, various other reducing agents may be used, such as NaHS, acid ammonium sulphide, aluminum or hydrogen. Any non-oxidizing mineral acid may be used in place of the sulphuric acid in the rearrangement operation.

If the hydroxylamine intermediate happens to be insoluble in water, a convenient mixture of water and alcohol may be used to retain the same in solution.

Instead of evaporating the neutralized filtrate after precipitation therefrom of most of the amino hydroxy compound, the filtrate of unevaporated neutral solution may be used in place of the ammonium salt solution in the first step of reduction with a fresh amount of the nitrobenzene. This procedure enables recovery of all the amino hydroxy compound without having to evaporate the filtrate.

The expression "an aminophenol" where used in the claims is to be understood as referring broadly to hydroxy-amino compounds of the aromatic series, in which hydroxy and amino radicals are linked directly to the aromatic nucleus.

Although I have described in detail only the preferred embodiments of the invention, it will be apparent to those skilled in the art that the invention is not limited thereto, but that various modifications may be made without departing from the spirit of the invention or from the scope of the appended claims.

Having thus described my invention, what I claim and desire to protect by Letters Patent is:

1. A process of making an amino hydroxy derivative of a cyclic compound from a nitro derivative of the corresponding parent cyclic compound, which comprises reacting a chemical reducing agent with the nitro cyclic compound in the presence of water under substantially neutral conditions whereby to form the corresponding hydroxylamine, thereafter acidifying the said solution containing the hydroxylamine compound, without isolation or purification of the latter, with a non-oxidizing mineral acid compound, and heating the solution to rearrange the hydroxylamine compound to an amino hydroxy derivative, the total amount of water present after acidification and rearrangement being insufficient to dissolve more than about 20% of the finally formed derivative, then cooling and neutralizing the solution whereupon the amino hydroxy derivative precipitates and is separated from the watery mother liquor by filtration.

2. A process of making an aminophenol from the corresponding parent nitro-aromatic compound which comprises reacting a chemical reducing agent with the nitro-aromatic compound in the presence of water under substantially neutral conditions whereby to form the corresponding hydroxylamine, thereafter acidifying the said solution containing the hydroxylamine compound without isolating or purifying the latter, with a non-oxidizing mineral acid compound and heating the solution to rearrange the hydroxylamine compound to an aminophenol compound, the total amount of water present after acidification and rearrangement being insufficient to dissolve more than about 20% of the finally formed derivative, then cooling and neutralizing the solution whereupon about 80% or more of the aminophenol separates and is recovered from the watery mother liquor by filtration.

3. A process of making an amino-aryl hydroxy compound from the corresponding parent aryl nitro compound which comprises agitating a mixture of zinc dust with the aryl nitro compound in the presence of water and a substantially neutral non-oxidizing ammonium salt, whereby to convert the nitro group into a hydroxylamine group, filtering the liquor containing the aryl hydroxylamine compound, and without isolating or purifying the latter, acidifying said filtrate with a non-oxidizing mineral acid and heating and rearranging the aryl hydroxylamine compound to an amino-aryl hydroxy compound, the total amount of water present after acidification being insufficient to dissolve more than about 20% of the finally formed amino-aryl hydroxy compound, then precipitating at least about 80% of the desired amino-aryl hydroxy compound from the solution by cooling and neutralizing the solution, and separating the precipitated amino-aryl hydroxy compound from the watery mother liquor by filtration.

4. A process of making an amino-aryl hydroxy compound from the corresponding aryl nitro compound which comprises reacting the aryl nitro compound in substantially neutral aqueous solution with a chemical reducing agent of a character capable of converting the nitro group to a hydroxylamine group, then acidifying said solution containing the hydroxylamine compound, without isolating or purifying the latter, with a non-oxidizing mineral acid compound, and heating to about 80° C. to about 100° C. to rearrange the hydroxylamine compound to an amino-aryl hydroxy compound, in the presence of an amount of water insufficient to dissolve more than about 20% of the finally formed amino-aryl hydroxy compound.

5. A process of making p-aminophenol from nitrobenzene which comprises reacting zinc dust with nitrobenzene in water under substantially neutral conditions whereby to form phenyl hydroxylamine, separating from the aqueous solution the zinc hydroxide that is formed during the reaction, then acidifying the said aqueous solution containing phenyl hydroxylamine, without isolation or purification of the latter, with a non-oxidizing mineral acid and heating to a temperature of at least about 80° C. whereby to form a p-aminophenol, the total amount of water present after acidification being insufficient to dissolve more than about 20% of the finally formed p-aminophenol, then precipitating the desired p-aminophenol from the solution by cooling and neutralizing the solution and filtering to recover the precipitated p-aminophenol from the watery mother liquor.

6. A process of making an aminophenol from the corresponding aromatic nitro compound which comprises chemically reducing the nitro compound mixed with water under substantially neutral conditions to form an aqueous solution of the corresponding hydroxylamine compound, and, without isolating or purifying the hydroxylamine compound, acidifying the said aqueous solution with a relatively concentrated aqueous solution of a mineral acid and heating and rearranging the hydroxylamine compound to an aminophenol compound, the total amount of water after acidification being insufficient to dissolve more than about 20% of the finally formed aminophenol, then precipitating at least about 80% of the desired aminophenol by cooling and neutralizing and finally separating the precipitated aminophenol from the watery mother liquor by filtration.

7. A process of making an aminophenol from the corresponding aromatic nitro compound which comprises chemically reducing the nitro compound to the aryl hydroxylamine compound in substantially neutral aqueous solution, then acidifying said solution containing the hydroxylamine compound, without isolation or purification of the latter, with a non-oxidizing mineral acid, of a concentration such that the total amount of water in the acidified solution remains insufficient to dissolve more than about 20% of the subsequently formed aminophenol, heating the solution and rearranging the aryl hydroxylamine compound to an aminophenol compound, then precipitating the aminophenol by cooling and neutralizing the acid solution, and separating the precipitated aminophenol from the watery mother liquor by filtration.

HENRY HALL BASSFORD, Jr.